(12) United States Patent
Tohma et al.

(10) Patent No.: US 7,589,892 B2
(45) Date of Patent: Sep. 15, 2009

(54) SPECIMEN IMAGING APPARATUS AND SPECIMEN ANALYZER

(75) Inventors: Ryuichi Tohma, Akashi (JP); Tokihiro Kosaka, Kakogawa (JP)

(73) Assignee: Sysmex Corporation, Kobe-shi (JP)

( * ) Notice: Subject to any disclaimer, the term of this patent is extended or adjusted under 35 U.S.C. 154(b) by 4 days.

(21) Appl. No.: 11/644,603

(22) Filed: Dec. 22, 2006

(65) Prior Publication Data

US 2007/0159687 A1    Jul. 12, 2007

(30) Foreign Application Priority Data

Dec. 22, 2005    (JP)    ............................. 2005-369459

(51) Int. Cl.
*G02B 21/00*    (2006.01)
(52) U.S. Cl. .................. 359/379; 359/368; 359/383
(58) Field of Classification Search ......... 359/368–390, 359/554–557
See application file for complete search history.

(56) References Cited

U.S. PATENT DOCUMENTS 4,625,103 A * 11/1986 Kitamura et al. ......... 250/201.4
5,351,152 A * 9/1994 Kuo et al. ................... 359/376
6,043,490 A * 3/2000 Sakai ......................... 250/310
7,390,997 B2 * 6/2008 Tohma ..................... 250/201.3
2005/0280830 A1 * 12/2005 Rembe ....................... 356/511

FOREIGN PATENT DOCUMENTS

| JP | 61-219805 | * | 9/1986 | ................. 359/368 |
| JP | 4-366711 | * | 12/1992 | ................. 359/368 |
| JP | 07-020124 | | 1/1995 | |
| JP | 9-197286 | * | 7/1997 | ................. 359/368 |

* cited by examiner

*Primary Examiner*—Thong Nguyen
(74) *Attorney, Agent, or Firm*—Brinks Hofer Gilson & Lione

(57) ABSTRACT

A specimen imaging apparatus is provided that is capable of improved high-speed operation compared to conventional apparatuses. The specimen imaging apparatus is provided with a microscope for enlarging the image of a specimen, and taking the enlarged image of the specimen obtained by the microscope. The apparatus is provided with a vibration detector for detecting a relative vibration between the objective lens of the microscope and the specimen mounted in the microscope, a focuser for focusing before the vibration detected by the vibration detector has attenuated to less than a predetermined value, and a controller for determining whether or not a vibration detected by the vibration detector is less than a predetermined value. The specimen imaging apparatus is configured so as to take the enlarged image of a specimen when the controller has determined that the vibration is less than a predetermined value.

15 Claims, 9 Drawing Sheets

SPECIMEN IMAGING APPARATUS AND SPECIMEN ANALYZER

This application claims priority under 35 U.S.C. §119 to Japanese Patent Application No. JP2005-369459 filed Dec. 22, 2005, the entire content of which is hereby incorporated by reference.

FIELD OF THE INVENTION

The present invention relates to a specimen imaging apparatus and specimen analyzer.

BACKGROUND OF THE INVENTION

Blood cell analyzers for classifying and counting blood cells are provided with an automatic microscope, a means for taking an image of a cell that has been enlarged by the microscope, and an image processor for processing the obtained image and obtaining desired analysis information such as the number of blood cells of each classification (for example, refer to Japanese Laid-Open Patent Publication No. 7-20124).

The apparatus disclosed in Japanese Laid-Open Patent Publication No. 7-20124 is provided with a microscope for enlarging blood cells smeared on a slide glass, and a color television camera for taking the microscope image. The slide glass with the blood smear is installed on the stage of the microscope, the stage is displaced in the XY direction by the stage drive circuit to adjust the position of the slide glass on the stage. Furthermore, an objective lens is displaced vertically (Z-axis direction) by a focus drive circuit to adjust the focal position by auto focusing. The image from the microscope is taken by the color television camera, and the blood cell image is displayed on an RGB monitor.

Although this type of blood cell analyzer moves the stage to adjust the position of the slide glass, inertia may cause the stage to vibrate when the stage is stopped after positional adjustment. Then, when the auto focusing is performed prior to the attenuation of the stage vibration, the lens cannot be accurately focused on the specimen on the slide glass. Moreover, when imaging is executed before the vibration has attenuated, defocusing or image blurring occur in the obtained image. Therefore, in this type of conventional apparatus, the apparatus waits for a predetermined time until the vibration has attenuated after the stage has stopped, then auto focusing is executed and thereafter the enlarged image is obtained.

In conventional blood cell analyzers, however, sufficient waiting time must be ensured for the attenuation of the vibration in order to reliably attenuate stage vibration and take a clear enlarged image without blurring, thus slowing down the operation (processing speed) of the apparatus. In addition, since the vibration of the stage can not be detected, it is impossible to determine whether or not the vibration has attenuated, such that imaging may occur before the vibration has attenuated.

SUMMARY OF THE INVENTION

The scope of the present invention is defined solely by the appended claims, and is not affected to any degree by the statements within this summary.

The first aspect of the present invention relates to a specimen imaging apparatus for taking a magnified image of specimen, comprising:

a microscope, comprising an objective lens, for magnifying an image of a specimen;

a vibration detector for detecting relative vibration between the specimen and the objective lens of the microscope; and an imaging device for taking the image of the specimen magnified by the microscope based on the relative vibration detected by the vibration detector.

The second aspect of the present invention relates to a specimen imaging apparatus for taking a magnified image of specimen, comprising:

a microscope, comprising an objective lens, for magnifying an image of a specimen;

a moving device for moving specimen to be imaged;

a cell detecting section for detecting a cell in the specimen moved by the moving device;

a focusing device for focusing the microscope on the specimen;

a vibration detector for detecting relative vibration between the specimen and the objective lens of the microscope; and an imaging device for taking the image of the cell detected by the cell detecting section based on the relative vibration detected by the vibration detector.

The third aspect of the present invention relates to a specimen imaging apparatus for taking a magnified image of specimen, comprising:

a microscope, comprising an objective lens, for magnifying an image of a specimen; and a monitoring section for monitoring relative vibration between the specimen and the objective lens of the microscope.

The fourth aspect of the present invention relates to a specimen analyzer comprising:

a microscope, comprising an objective lens, for magnifying an image of a specimen;

a vibration detector for detecting relative vibration between the specimen and the objective lens of the microscope;

an imaging device for taking the image of the specimen magnified by the microscope based on the relative vibration detected by the vibration detector; and an analyzing section for analyzing the specimen based on the image of the specimen taken by the imaging device.

The fifth aspect of the present invention relates to a specimen analyzer comprising:

a microscope, comprising an objective lens, for magnifying an image of a specimen;

a moving device for moving specimen to be imaged;

a cell detecting section for detecting a cell in the specimen moved by the moving device;

a focusing device for focusing the microscope on the specimen;

a vibration detector for detecting relative vibration between the specimen and the objective lens of the microscope;

an imaging device for taking the image of the cell detected by the cell detecting section based on the relative vibration detected by the vibration detector; and an analyzing section for analyzing the specimen based on the image of the specimen taken by the imaging device.

The sixth aspect of the present invention relates to a specimen analyzer comprising:

a microscope, comprising an objective lens, for magnifying an image of a specimen;

a monitoring section for monitoring relative vibration between the specimen and the objective lens of the microscope;

an imaging device for taking the image of the specimen magnified by the microscope based on the relative vibration monitored by the monitoring section; and an analyzing section for analyzing the specimen based on the image of the specimen taken by the imaging device.

DETAILED DESCRIPTION OF THE DRAWINGS AND THE PRESENTLY PREFERRED EMBODIMENTS

The embodiment of the specimen imaging apparatus and specimen analyzer are described hereinafter based on the drawings.

Figure 1:
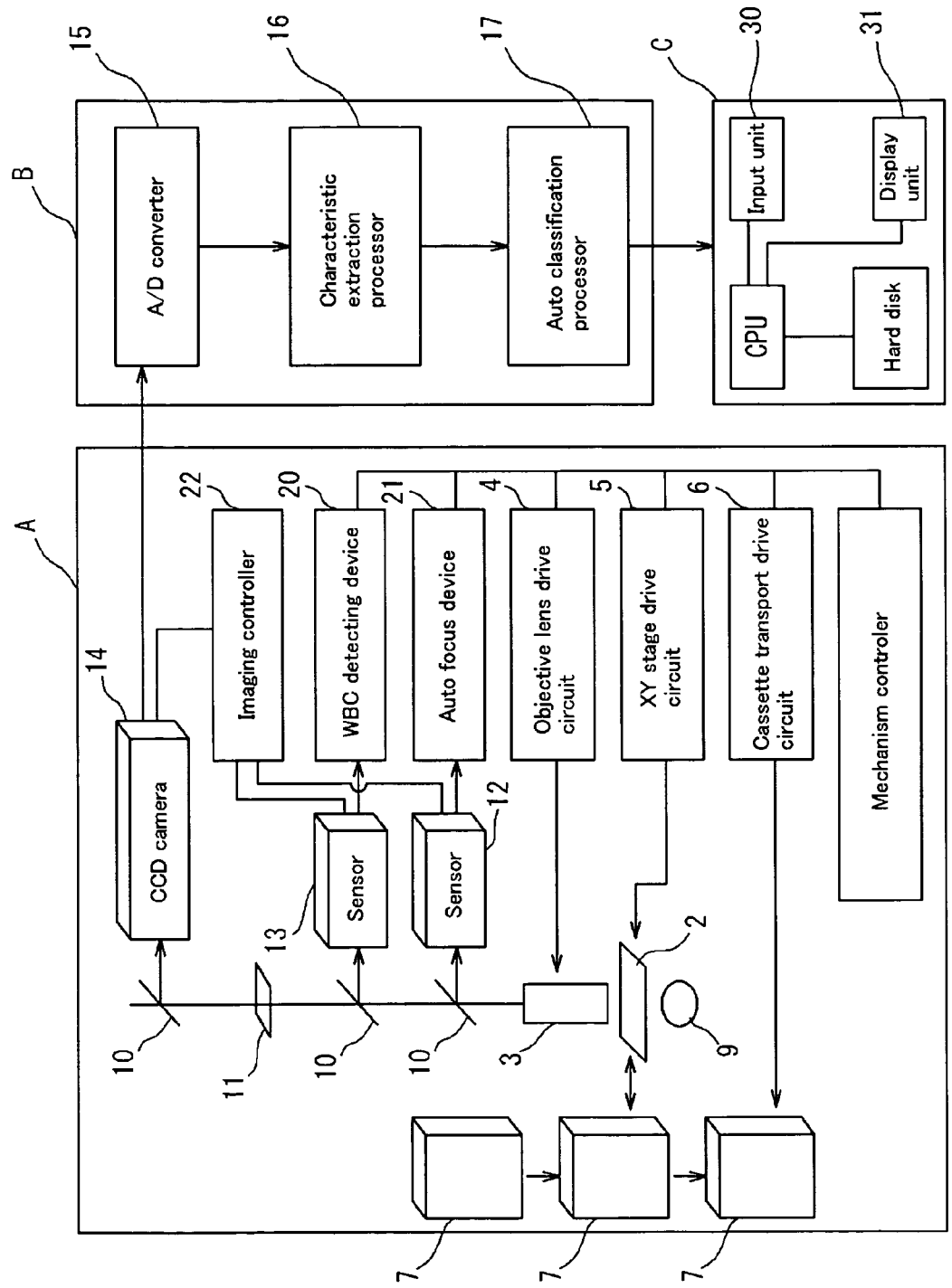
FIG. 1 is a block diagram showing the structure of a blood specimen analyzer that includes an embodiment of the specimen imaging apparatus.

FIG. 1 is a block diagram showing the structure of a blood specimen analyzer that includes an embodiment of the specimen imaging apparatus. FIG. 1 schematically shows the structure of the apparatus; the actual layout of the sensors and slide cassette and the like has been altered slightly to facilitate understanding. For example, although the WBC detecting sensor and the focusing sensor are shown in a vertical arrangement in FIG. 1, the actual arrangement has both sensors disposed within the same approximately plane, as shown in FIG. 3, which is described later.

The blood specimen analyzer is configured by a specimen imaging apparatus A for taking an enlarged image of a blood specimen that has been focused by auto focusing, an image processing apparatus B for processing the obtained image, classifying the white blood cells in the blood, and counting the number of white blood cells of each classification, and a personal computer C provided with an input unit 30 connected to the image processing apparatus for inputting various types of instructions for analysis, and a display unit 31 for displaying the obtained images and analysis results and the like. Moreover, the image processing apparatus B and personal computer C may be integrated so as to include the functions of the image processing apparatus B within the personal computer C, rather than have them separate.

Figure 3:
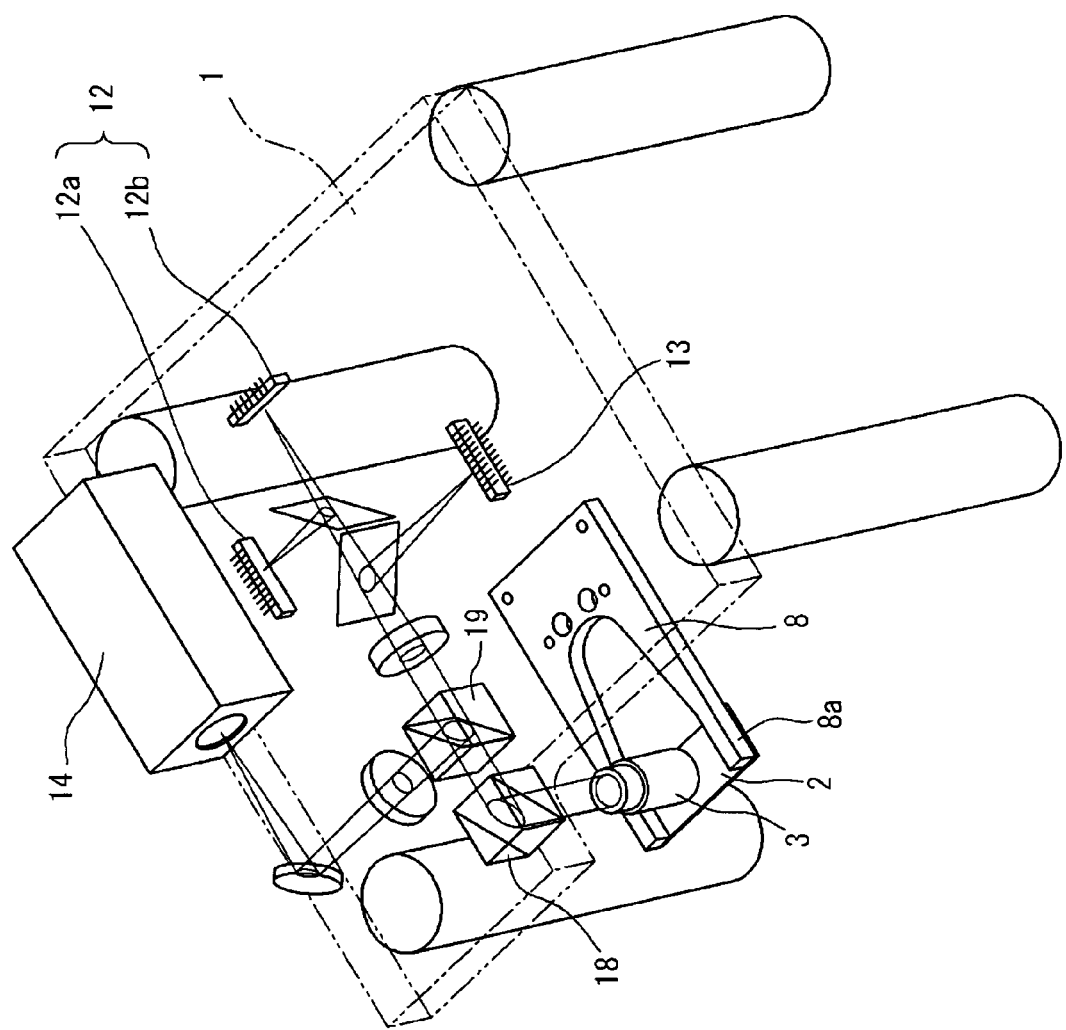
FIG. 3 is a perspective view of the essential parts of the specimen imaging apparatus.

The specimen imaging apparatus A is provided with an objective lens 3 configuring part of a microscope lens system for enlarging the image of blood (specimen) thinly smeared on a slide glass disposed on an XY stage 1 (refer to FIG. 3). The XY stage 1, which is a holding part for holding a specimen, is controlled by an XY stage drive circuit 5, and is moved forward and back and laterally (X direction and Y direction) by a drive part (not shown in the drawing) that is a moving device; moreover, the objective lens 3 is moved substantially vertically (Z direction) by a drive part (not shown in the drawing) that is controlled by an objective lens drive circuit 4.

The slide glass 2 is housed inside a slide cassette 7 that accommodated a plurality of stacked slides, and the slide cassette 7 is transported by a transporting part (not shown in the drawing) whose actuation is controlled by a cassette transport drive circuit 6. A chuck 8 for holding the slide glass 2 at two locations near the bilateral ends in the lengthwise direction is provided on the XY stage 1 so as to be capable of advancing and receding relative to the slide glass 2 housed within the slide cassette 7 that has been stopped at a predetermined position. Then, the chuck 8 is advanced toward the slide cassette 7, and grips the slide glass 2 by opening and closing a hook part 8a that is capable of being opened and closed and is formed on the leading end of the chuck 8; a slide glass 2 is pulled from the slide cassette 7 by receding the chuck 8, and the slide glass 2 is positioned at a predetermined position on the XY stage 1.

A light source lamp 9 is disposed below the slide glass 2, and the light from this lamp 9 passes through the blood on the slide glass 2 then passes through a half mirror 10 and interference filter 11 disposed on the optical path, then enters an auto focus sensor (photoreceptor) 12, white blood cell (WBC) detection sensor (photoreceptor) 13, and CCD camera 14. Then, the white blood cells are detected by a white blood cell detecting device 20 based on the signals of the incidence light, and an auto focus operation is performed by an auto focus device 21. In the present embodiment, the auto focus device is configured by the sensor 12, the auto focus device 21, the drive part of objective lens 3, and the objective lens drive circuit 4. An imaging controller 22 is also provided to control the imaging, which includes transmission of an imaging start signal, and this imaging controller 22 is provided with a determining means for determining whether or not a relative vibration between the specimen and the objective lens 3 has attenuated.

The image processing apparatus B has an A/D converter 15, characteristic extraction processor 16, and auto classification processor 17; and the imaging signals for the image taken by the CCD camera 14 are converted from analog signals to digital signals by the A/D converter 15. Then, the characteristic parameters of white blood cells are calculated by the characteristic extraction processor 16 based on the digital signals. The characteristic parameters include white blood cell nucleus area, number of the nucleus, asperity of the nucleus, color tone of the nucleus, density (uneven of density) of the nucleus, white blood cell cytoplasm area, color tone of the cytoplasm, density (uneven of density) of the cytoplasm, and area ratio and density ratio and the like of the nucleus and cytoplasm. These characteristic parameters are used to automatically classify and count the types of white blood cells via the auto classification processor 17. Specifically, the types of white blood cells can be gradually determined by, for example, sequentially comparing the various characteristic parameters of a white blood cell to determining a standard value that has been previously determined for each parameter. Thus, the imaged white blood cell can be classified as a type of mature white blood cell such as lymphocyte, monocyte, eosinophil, basophil, neutrophil (stab neutrophil, segmented neutrophil), or a type of immature white blood cell such as blast cell, juvenile granulocyte, atypical lymphocyte, as well as erythroblast.

The specimen imaging apparatus of the present embodiment is provided with an auto focus function to perform focusing automatically, and the sequence flow of the auto focus operation is described below.

Figure 2A:
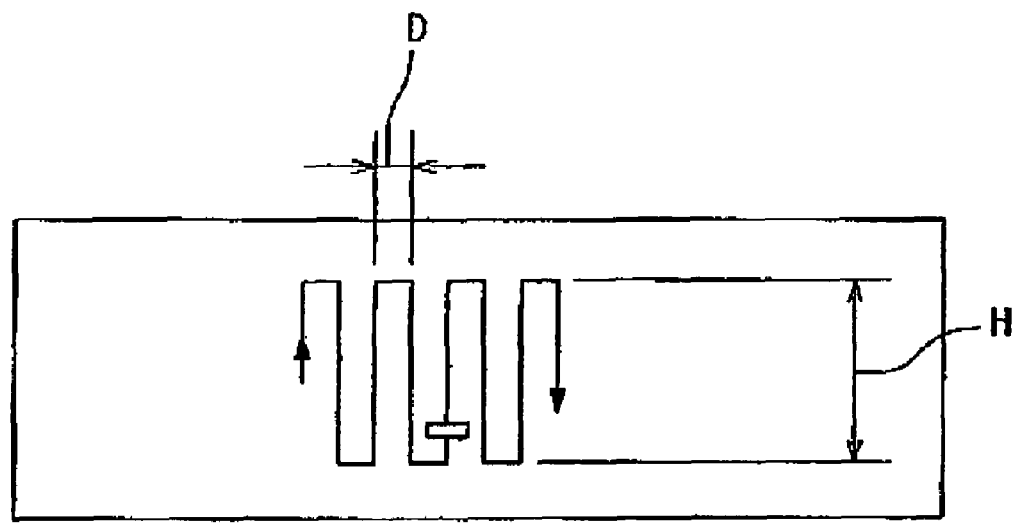
FIG. 2(a) the pattern of scanning a specimen on a slide glass.

First, the white blood cells in the blood smeared on the slide glass 2 are detected before the auto focus. This detection is accomplished using the previously mentioned sensor 13. The sensor 13 is a line sensor with a field of view of approximately 400 μm. Then, the XY stage 1 is moved in the X direction and Y direction (refer to FIG. 2(a)) so as to have the sensor 13 scan the slide glass 2 from one end to another in an approximate zigzag pattern in the length direction. An interval D of the zigzag scan in the lengthwise direction of the slide glass 2 is normally approximately 300 μm from the viewpoint of scanning efficiency and avoiding detection omissions, and the scanning dimension H in the width direction of the slide glass 2 normally approximately 16 mm since the width of the slide glass 2 is typically about 26 mm.

Figure 2B:
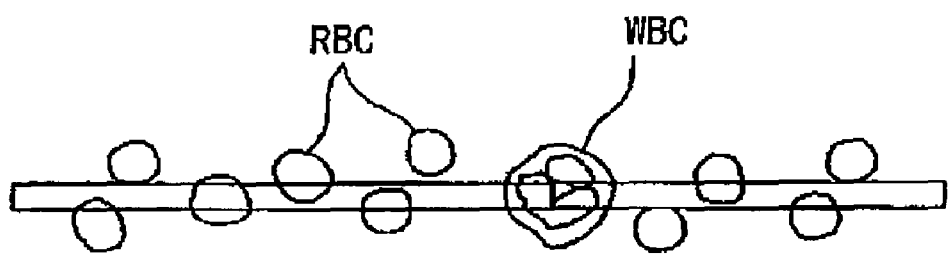
FIG. 2(b) shows the field of vision of a line sensor and a blood cell on its periphery.
Figure 2C:
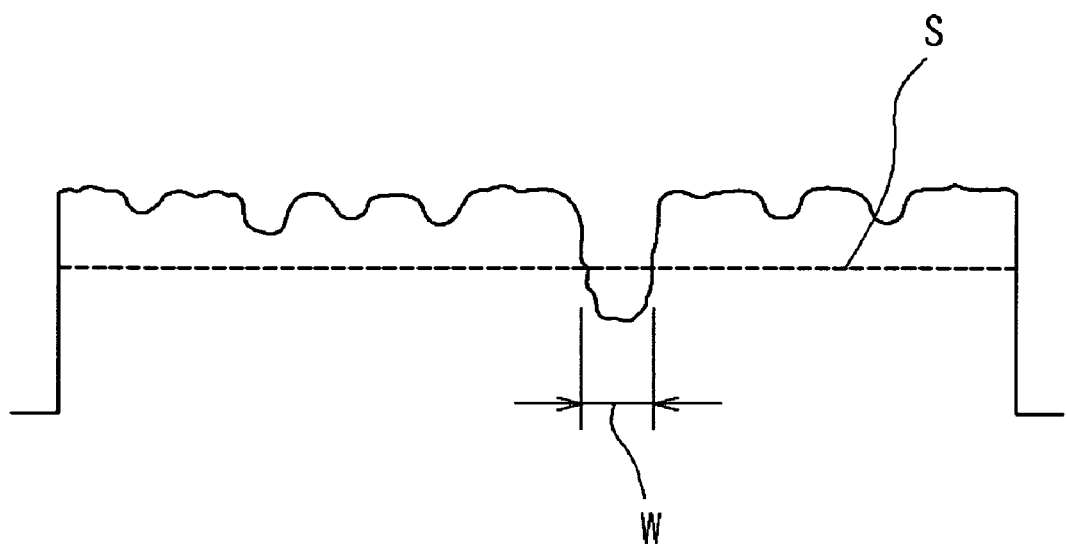
FIG. 2(c) shows the line sensor detection signals.

Since the nucleus of a white blood cell WBC absorbs a large amount of the red component of light, white blood cells (WBC) and red blood cells (RBC) can be easily differentiated by detecting the red component. FIG. 2(b) shows the presence of a white blood cell within the field of view of the line sensor; in this case, the red light component of the signal detected by the line sensor is less than a standard value S at the location at which the white blood cell is present, as shown in FIG. 2(c). The white blood cells in the blood can be detected using this phenomenon. It is possible to check whether or not part of the signal indicates a white blood cell by detecting the width W of the red component of the signal that is less than the standard value S.

Auto Focus (Non-Vibration Time)

When a relative vibration is generated between the specimen and the objective lens, the specimen imaging apparatus executes the auto focus operation while the vibration is generated and does not perform the auto focus operation after the vibration has attenuated; below, the auto focus operation is first described for the case in which a large vibration sufficient to affect image quality is not generated.

FIG. 3 is a perspective view of the essential parts of the specimen imaging apparatus of the present embodiment; light that has passed through the slide glass 2 and the objective lens 3 is directionally redirected by a prism mirror 18 and split into light that is directed toward the CCD camera 14 by a half mirror 19, and light that is directed toward the sensors 12 and 13. The sensor 12 is an auto focus sensor (line sensor), and is configured by two sensors 12a and 12b. The sensor 13 is a white blood cell detection sensor (line sensor). The sensors 12 and 13 also function as vibration detection means for detecting a relative vibration between the specimen and the objective lens 3 as will be described later.

Figure 4:
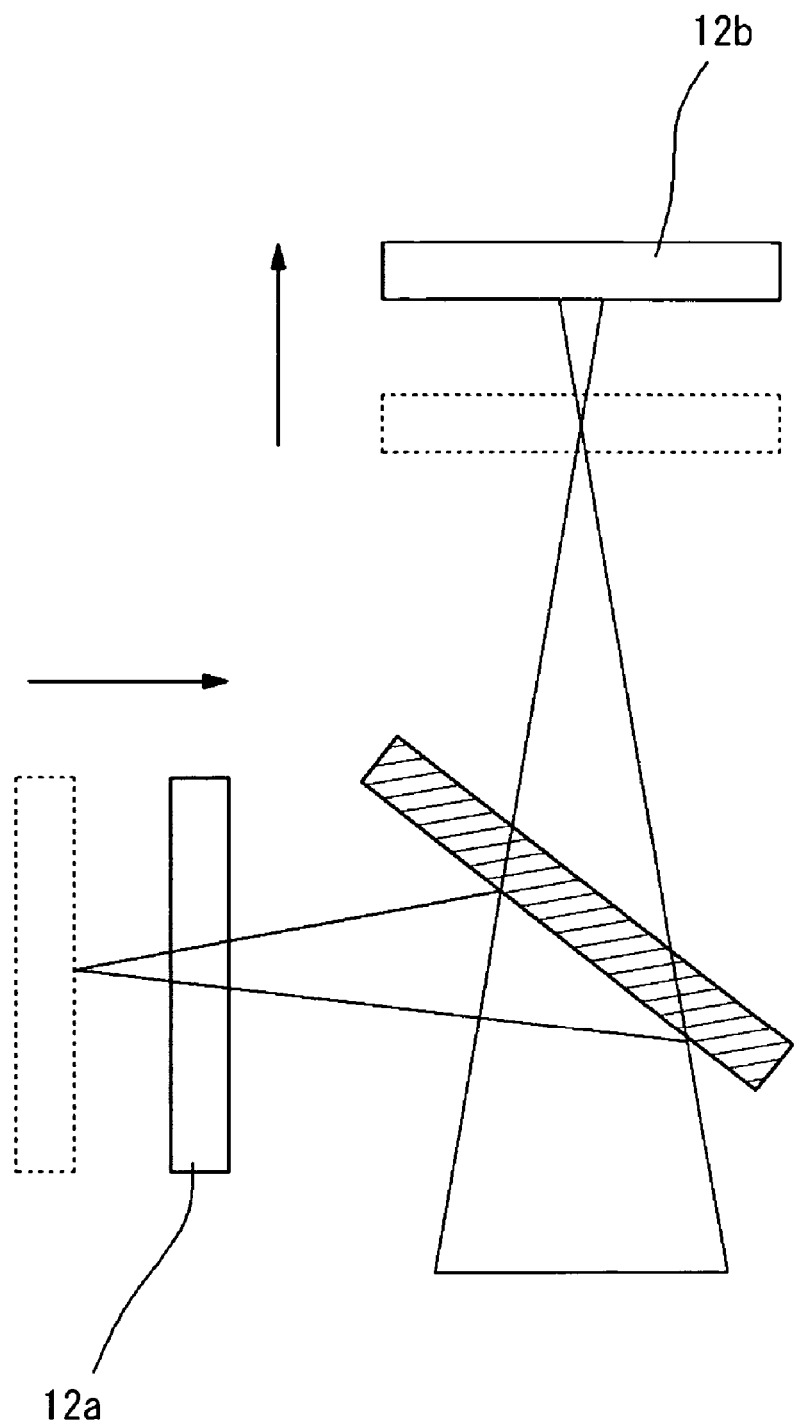
FIG. 4 illustrates the layout of the two focusing sensors.

As shown in FIG. 4, the sensor 12a among the two auto focus sensors 12a and 12b is disposed on the front side of the focal position (position at which the view is focused). In other words, an optical distance from the objective lens to the sensor 12a is shorter than an optical distance from the objective lens to the focal position. And the other sensor 12b is disposed on the rear side of the focal position. In other words, an optical distance from the objective lens to the sensor 12b is longer than the optical distance from objective lens to the focal position.

Figure 5A:
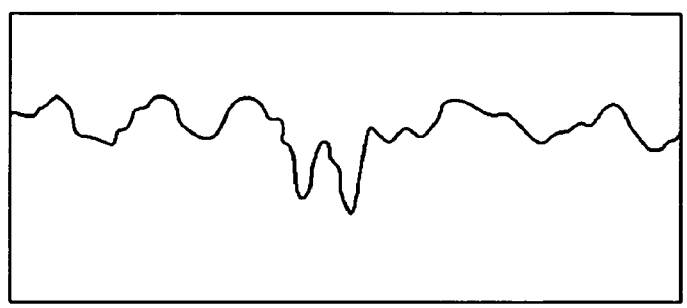
FIG. 5(a) shows a signal waveform of the focusing sensor at a position shifted from the focal position.
Figure 5B:
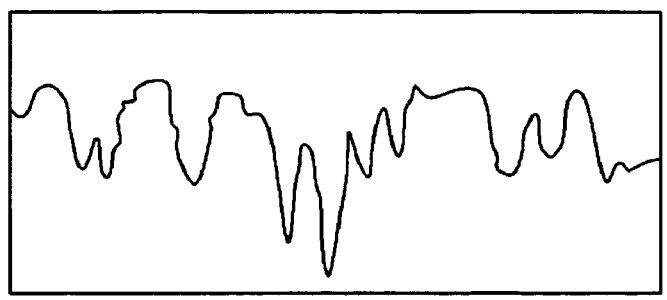
FIG. 5(b) shows a signal waveform of the focusing sensor at the focal position.

The signal waveform of the sensor at the focal position is a waveform of large amplitude, as shown in FIG. 5(b), due to the clear contrast. And the signal waveform of the sensor at a non-focal position is an overall moderate and small amplitude waveform, as shown in FIG. 5(a), because the contrast is not so sharp. Approximately 2000 pixels are typically arranged in a linear array in a line sensor, and a value of an integrated signal difference between adjacent pixels of the line sensor (referred to below as a difference integration value) increase as the focus improves.

Figure 6:
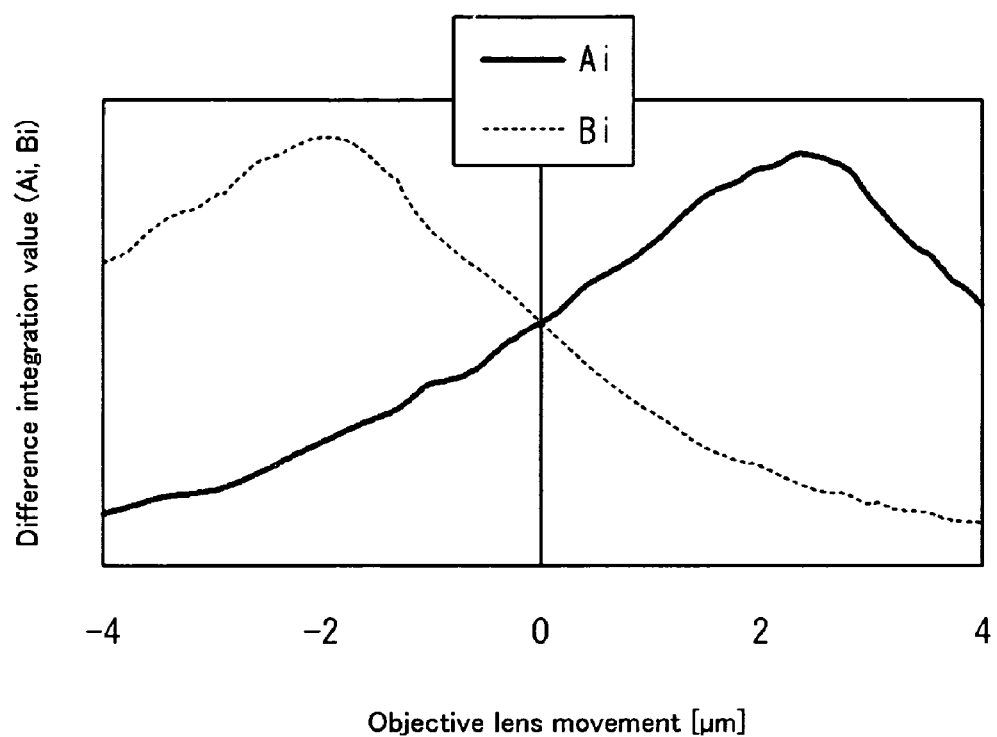
FIG. 6 shows the relationship between amount of movement of the objective lens and the difference integration value, that is, the value of the integrated difference of the signals of adjacent pixels of the two focusing sensors.

FIG. 6 shows the respective difference integration values of the two sensors when the amount of movement of the objective lens 3 is plotted on the horizontal axis. Ai represents the difference integration value of the sensor 12a disposed on the front side of the focus point, and Bi represents the difference integration value of the sensor 12b disposed on the rear side of the focus point. In the case of the sensor 12a, focus is attained and the difference integration value Ai has a peak value when the objective lens is moved upward (i.e. the objective lens is moved away from the slide glass) by about 2 μm from a focal position of the objective lens at which a focal point of the objective lens is on the CCD camera 14. In the case of the sensor 12b, focus is attained and the difference integration value Bi has a peak value when the objective lens is moved downward (i.e. the objective lens is moved toward the slide glass) by about 2 μm from the focal position of the objective lens.

Figure 7:
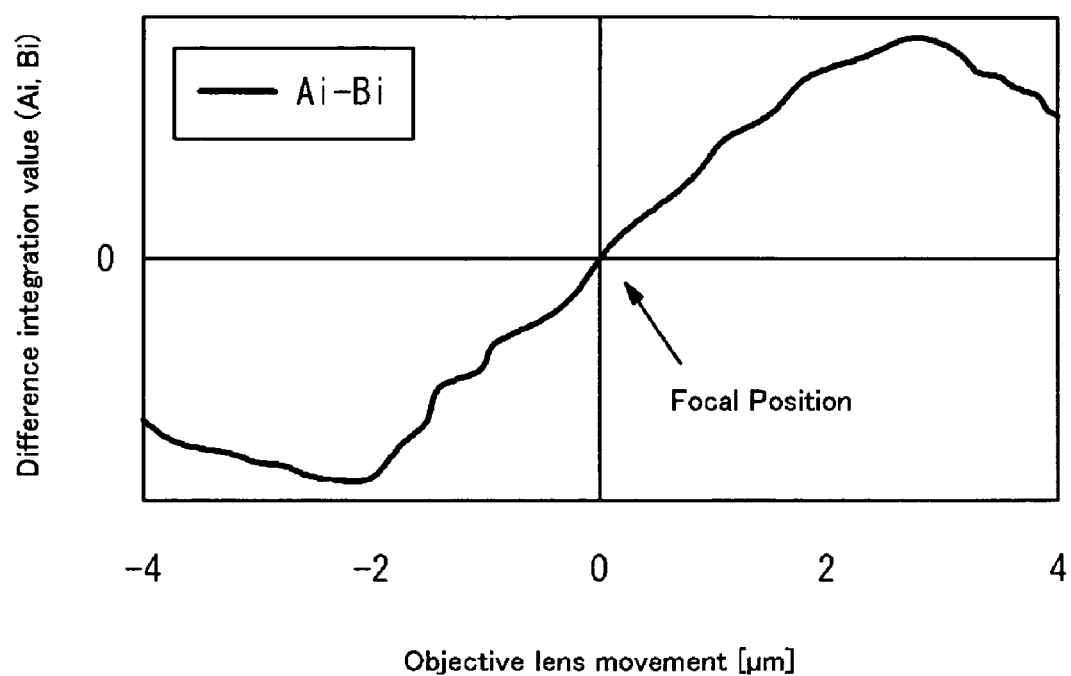
FIG. 7 shows the relationship between amount of movement of the objective lens and the difference of the difference integration values of the two focusing sensors.

When only one sensor, for example, only the sensor 12a, is used for focusing, it is impossible to determine the moving direction of the objective lens for obtaining the peak value of the difference integration value Ai. In this case, the objective lens must be moved by trial and error to achieve focusing, such that the auto focus operation requires considerable time. Conversely, when two sensors in the previously described disposition are used for focusing and the difference integration values of the two sensors (Ai–Bi) are determined, as shown in FIG. 7, it is possible to perform auto focusing in a short time. That is, when the focal position is Ai–Bi=0 by adjusting the microscope beforehand so as to match the focal point of the objective lens with the specimen on the slide glass, auto focusing can be performed simply by moving the objective lens in a direction toward Ai–Bi=0, Auto Focus (Vibration Time)

Figure 8:
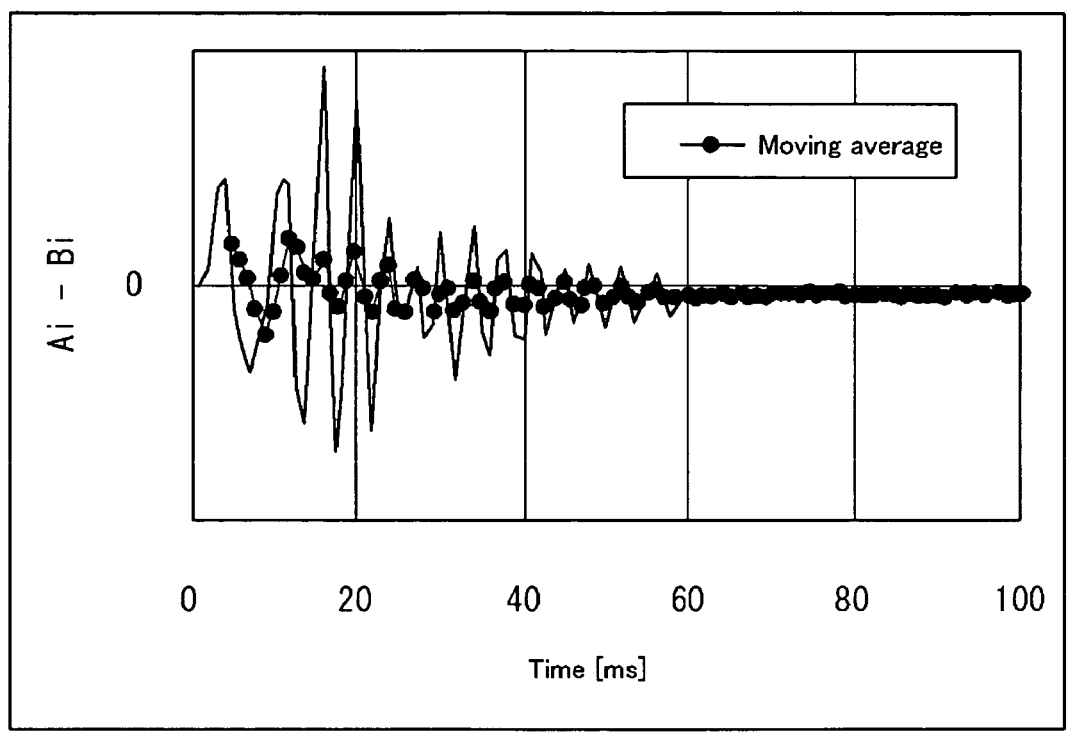
FIG. 8 shows the residual vibration movement directly after the stage is stopped.

As shown in FIG. 7, the value (Ai–Bi) at a particular time has a single value, and when, for example, a table or base on which the automatic microscope is installed is jarred by someone or something, or when the XY stage is moved for white blood cell detection and the XY stage is stopped after detection, a relative vibration is generated between microscope lens and the slide glass disposed on the XY stage, that is, between the specimen and the objective lens, such that the (Ai–Bi) value also fluctuates for the same period as the vibration. FIG. 8 shows the (Ai–Bi) value directly after the XY stage has stopped following white blood cell detection. Since the (Ai–Bi) value wavers between positive and negative values until the residual vibration has attenuated, auto focusing can not be performed because the direction on the Z-axis in which to move the object lens can not be determined based on the (Ai–Bi) value during this vibration.

However, since the (Ai–Bi) value only fluctuates with the same magnitude in the positive and negative sides about a value attained during non-vibration time (the value when there is no vibration), it is possible to infer an approximate value of the (Ai–Bi) value when the vibration has attenuated by obtaining a moving average value of the (Ai–Bi) so as to include one period of the fluctuation. In other words, the focal position when the vibration has attenuated can be inferred, and the objective lens can be moved such that the lens focus point matches the specimen on the slide glass.

The period of relative vibration between the slide glass and the objective lens of the microscope differs depending on a natural frequency which is determined by the weight and material of the apparatus and the assembly of the device. The natural frequency of the designed specimen imaging apparatus is determined beforehand, so that the moving average can be determined by averaging (Ai–Bi) by the values of the periods of the natural frequency. For example, if the vibration period of the specimen imaging apparatus is 5 msec, the (Ai–Bi) value is calculated for each 1 msec, and the values of the past one period are averaged by averaging the nearest five values, such that whether or not the (Ai–Bi) value (the value during the vibration attenuation time) is positive or negative can be determined by the obtained moving average value. Then, the auto focus direction can be understood accurately and the objective lens can be moved based on the moving average value regardless of whether the vibration is on-going, and the auto focusing can be started because the amount of movement of the objective lens can be inferred. The focal position can be inferred even at the point in time when the vibration is greatest and near 20 msec as shown in FIG. 8. Auto focusing according to the decrease (attenuation) of the vibration is completed by calculating the moving average value and repeating the objective lens movement a plurality of times based on that calculated value.

Thus, if a relative vibration between the microscope lens and the slide glass disposed on the XY stage is being generated by someone or something jarring the base or table on which the specimen imaging apparatus is installed, the specimen imaging apparatus of the present embodiment executes the auto focus operation while avoiding the effects of vibration. Consequently, the time necessary for the auto focus operation of the present embodiment can be greatly reduced compared to time necessary for an auto focus operation is started after the vibration has attenuated. Specifically, the auto focus operation is conventionally executed after vibration has attenuated by waiting approximately 50 msec after the white blood cells are detected and the XY stage has stopped. On the other hands, the present embodiment allows the auto focus operation to be executed during the vibration, thereby reducing the time necessary for auto focusing at least by the amount of waiting time. As a result, processing speed is increased when an enlarged specimen image is taken and various processes are performed based on the obtained image.

Imaging Execution

The specimen imaging apparatus of the present embodiment differs from a conventional apparatus that performs an auto focus operation and takes an image after the XY stage has stopped and a predetermined time has been awaited for the residual vibration to attenuate. The specimen imaging apparatus of the present embodiment is provided with means for detecting a relative vibration between the specimen and the objective lens that is generated after the XY stage stops so as to take an enlarged image of a specimen when a vibration has been determined to have attenuated.

The attenuation of the vibration is determined in the following manner. First, the sensors 12a and 12b are used to determine whether or not the vibration element in the optical axis direction has attenuated. The sensors 12a and 12b at disposed at mutually different positions. An optical distance between the position of sensor 12a and the specimen is different from an optical distance between the position of sensor 12b and the specimen. The difference in the focusing level between the two sensors 12a and 12b is calculated during auto focusing, and the difference in focusing level is also used for determining vibration attenuation. That is, when a vibration is generated in the optical axis direction, the optical distance between the specimen and the objective lens of the microscope fluctuates in conjunction with this vibration. Then, when the sensors are respectively disposed at positions that are mutually different optical distances from the specimen, the magnitude of the vibration element in the optical axis direction can be detected by determining the difference between the maximum value and minimum value of the difference in focusing levels within a predetermined time since the difference in focusing levels (contrast) of the two sensors fluctuates in accordance with the vibration (refer to FIG. 8). For example, one period (normally, approximately 3-10 msec) of the vibration of the specimen imaging apparatus can be set as the predetermined period. Then, the difference between the maximum value and the minimum value of the difference in focusing levels can be determined beforehand as a standard value when the vibration has actually been shielded, and it is possible to determine that the vibration is attenuated when a detected value is less than a predetermined value (for example, double the standard value). In the present embodiment, the magnitude of the vibration element in the optical axis direction can be monitored in this way.

The sensor 13 for detecting white blood cell (WBC) is used to determine the magnitude of the vibration element in a direction perpendicular to the optical axis direction at the specimen, so as to determine whether or not the vibration has attenuated. The difference in the amount of received light of the same pixel of the sensor 13 at different time points is calculated, and the magnitude of the vibration element in a direction perpendicular to the optical axis direction is detected based on the difference in the amount of received light. Although one pixel of the sensor 13 (a plurality of pixels are disposed in linear array) receives light from one point on the specimen when a vibration is not generated in a direction perpendicular to the optical axis direction, a single pixel of the sensor 13 receives light from different parts on the specimen when a vibration is generated in a direction perpendicular to the optical axis direction because the specimen shifts in the perpendicular direction. Therefore, the magnitude of the vibration element in a direction perpendicular to the optical axis direction is detected by determining the difference in the amount of light received by the same pixel of the photoreceptor part at different time points. Specifically, difference between amount of light received by a pixel at time point t0 and amount of light received by the pixel at time point t1 is determined. The process is performed with respective to a plurality of pixels, for example 500 pixels, in the sensor 13 having 2,000 pixels and the sum T1 of the differences is determined. Then, the sum Tn for a predetermined time interval is determined, and it is possible to determine that the vibration is attenuated when an average value of the sum in one period of the vibration of the apparatus is less than a predetermined value to exclude errors (the predetermined value can be determined in the same manner as the predetermined value for detecting a vibration in the optical axis direction). In the present embodiment, the vibration in a direction perpendicular to the optical axis direction can be monitored in this way. Then, imaging is executed via the CCD camera 14 after the vibration in the optical axis direction has been determined to have attenuated by monitoring the vibration in the optical axis direction, and after the vibration has been determined to have attenuated in a direction perpendicular to the optical axis direction. When a vibration is generated in the optical axis direction, the distance fluctuates between the specimen and the objective lens, such that when imaging is executed before the vibration has attenuated, the focus point shifts due to the vibration and causes defocusing, and a sharp image can not be obtained. Furthermore, since the relative positional relationship between the specimen and the optical axis fluctuates when a vibration is generated in a direction perpendicular to the optical axis direction, blurring of the image occurs when imaging is performed before the vibration that includes the this directional element has attenuated. However, a sharp image without defocusing and blurring can be obtained by respectively monitoring the vibration element in the optical axis direction and a direction perpendicular to the optical axis direction, and performing imaging after the vibrations have attenuated.

Blood cells are imaged in the embodiment described above, but since blood cells are extremely minute, the image of the sample including these cells must be enlarged to a high magnification (approximately several hundred times) by a microscope. Therefore, a small vibration may have a great effect on the apparatus. Furthermore, the specimen is moved by a moving device, and the operation of this moving device may also generate a vibration. Sharp images can be obtained by preventing defocusing and blurring of an image caused by vibration by providing a vibration detection means to detect a relative vibration between the specimen and the objective lens and taking an enlarged image of a cell based on the vibration detected by the vibration detection means, and the speed of the operation of the apparatus can be further increased compared to a conventional apparatus by reducing the time from the attenuation of vibration to imaging.

Although auto focusing is performed using two sensors $12a$ and $12b$ in the present embodiment, auto focusing may also be performed using a single sensor. Since the peak value of the difference integration value Ai can not be determined when only one sensor, for example, only the sensor $12a$, is used, the objective lens must be moved by trial and error to accomplish focusing, and this arrangement thus increases the time of the auto focus operation, but has the advantage of simplifying the structure by reducing the number of sensors. Since the focusing level fluctuates in conjunction with the vibration even when a single sensor is used, the vibration can be detected by detecting the focusing level.

Although focusing is accomplished by moving the objective lens vertically in the above embodiment, it is also possible to move the XY stage itself vertically. Furthermore, the period of relative vibration between the slide glass and the microscope lens may be measured automatically during the assembly of the specimen imaging operation device and the number of values (moving average at nearby points) for determining a moving average value and time interval for calculating the (Ai−Bi) value based on the measured vibration period value can also be determined. Additionally, the consecutive (Ai−Bi) value over 8 msec can be determined each time the XY stage stops, and this value can be subjected to FFT frequency analysis to calculate the length of one period by determining the frequency of maximum intensity (amplitude), and determining the number of values for determining the moving average value and time interval for calculating the (Ai−Bi) value based on the length of one period.

Although the present embodiment is provided with an auto focus function, the present invention is also applicable to a specimen imaging apparatus that is not provided with an auto focus function inasmuch as sharp images can be obtained by avoiding blurring and defocusing of and image caused by vibration, and reducing the time fro the attenuation of a vibration to imaging compared to conventional apparatus since and enlarged image of a specimen can be taken when it has been determined that a vibration detected by the vibration detection means has attenuated.

The foregoing detailed description and accompanying drawings have been provided by way of explanation and illustration, and are not intended to limit the scope of the appended claims. Many variations in the presently preferred embodiments illustrated herein will be obvious to one of ordinary skill in the art, and remain within the scope of the appended claims and their equivalents.

What is claimed is:

1. A specimen imaging apparatus for taking a magnified image of a specimen, comprising:
    a holder for holding the specimen:
    a moving device for moving the holder;
    a microscope comprising an objective lens for magnifying an image of the specimen held by the holder;
    a vibration detector for detecting relative vibration between the specimen and the objective lens of the microscope, the relative vibration being caused by a movement of the holder holding the specimen by the moving device;
    a controller for determining whether or not an amplitude of the relative vibration is smaller than a predetermined value; and
    an imaging device for taking the image of the specimen magnified by the microscope when the controller determines that the amplitude of the relative vibration is smaller than the predetermined value.

2. The specimen imaging apparatus according to claim 1, wherein the vibration detector comprises at least one light receiving device having a plurality of light receiving elements for receiving a light passing through the objective lens, and wherein the vibration detector is configured to detect the relative vibration based on amount of light received by the light receiving elements.

3. The specimen imaging apparatus according to claim 2, wherein the vibration detector is configured to detect an amplitude of the relative vibration which is related to an optical axis direction at the specimen.

4. The specimen imaging apparatus according to claim 3, wherein:
    two of the light receiving devices are respectively disposed at positions of mutually different optical distances from the specimen; and
    the vibration detector is configured to obtain the difference of focusing levels of the two of the light receiving devices and detect the amplitude of the relative vibration based on the time fluctuation of the obtained difference of the focusing levels.

5. The specimen imaging apparatus according to claim 2, wherein:
    the vibration detector is configured so as to detect an amplitude of the relative vibration which is related to a direction perpendicular to an optical axis direction at the specimen.

6. The specimen imaging apparatus according to claim 5, wherein:
    the vibration detector obtains the difference of light receiving levels of the same light receiving element of the light receiving device at different times and detects the amplitude of the relative vibration based on the obtained difference of the light receiving levels.

7. The specimen imaging apparatus according to claim 1, wherein:
    the moving device is configured so as to move the holder in at least a direction perpendicular to an optical axis direction at the specimen.

8. The specimen imaging apparatus according to claim 1, further comprising:

inference means for inferring a focal point of the objective lens when the amplitude of the relative vibration is smaller than the predetermined value, while the relative vibration remains; and a focusing device for focusing the microscope to the focal point inferred by the inference means, while the relative vibration remains.

9. A specimen imaging apparatus for taking a magnified image of a specimen, comprising:

a holder for holding the specimen;

a moving device for moving the holder;

a microscope comprising an objective lens for magnifying an image of the specimen held by the holder;

a cell detecting section for detecting a cell in the specimen moved by the moving device;

a focusing device for focusing the microscope on the specimen;

a vibration detector for detecting relative vibration between the specimen and the objective lens of the microscope, the relative vibration being caused by a movement of the holder holding the specimen by the moving device;

a controller for determining whether or not an amplitude of the relative vibration is smaller than a predetermined value; and an imaging device for taking the image of the cell detected by the cell detecting section when the controller determines that the amplitude of the relative vibration is smaller than the predetermined value.

10. A specimen analyzer comprising:

a holder for holding a specimen;

a moving device for moving the holder;

a microscope comprising an objective lens for magnifying an image of the specimen held by the holder;

a vibration detector for detecting relative vibration between the specimen and the objective lens of the microscope, the relative vibration being caused by a movement of the holder holding the specimen by the moving device;

a controller for determining whether or not an amplitude of the relative vibration is smaller than a predetermined value;

an imaging device for taking the image of the specimen magnified by the microscope when the controller determines that the amplitude of the relative vibration is smaller than the predetermined value; and an analyzing section for analyzing the specimen based on the image of the specimen taken by the imaging device.

11. The specimen analyzer according to claim 10, wherein:
the specimen is a blood specimen and the analyzing section is configured to analyze the blood specimen based on the magnified image of blood cells included in the blood specimen.

12. A specimen analyzer comprising:

a holder for holding a specimen;

a microscope comprising an objective lens for magnifying an image of the specimen held by the holder;

a moving device for moving the holder;

a cell detecting section for detecting a cell in the specimen moved by the moving device;

a focusing device for focusing the microscope on the specimen;

a vibration detector for detecting relative vibration between the specimen and the objective lens of the microscope, the relative vibration being caused by a movement of the holder holding the specimen by the moving device;

a controller for determining whether or not an amplitude of the relative vibration is smaller than a determined value;

an imaging device for taking the image of the cell detected by the cell detecting section when the controller determines that the amplitude of the relative vibration is smaller than the predetermined value; and an analyzing section for analyzing the specimen based on the image of the specimen taken by the imaging device.

13. The specimen analyzer according to claim 12, wherein:
the specimen is a blood specimen and the analyzing section is configured to analyze the blood specimen based on the magnified image of blood cells included in the blood specimen.

14. A specimen analyzer comprising:

a holder for holding a specimen;

a moving device for moving the holder;

a microscope comprising an objective lens for magnifying an image of the specimen held by the holder;

a monitoring section for monitoring relative vibration between the specimen and the objective lens of the microscope, the relative vibration being caused by a movement of the holder holding the specimen by the moving device;

a controller for determining whether or not an amplitude of the relative vibration is smaller than a predetermined value;

an imaging device for taking the image of the specimen magnified by the microscope when the controller determines that the amplitude of the relative vibration is smaller than the predetermined value; and an analyzing section for analyzing the specimen based on the image of the specimen taken by the imaging device.

15. The specimen analyzer according to claim 14, wherein:
the specimen is a blood specimen and the analyzing section is configured to analyze the blood specimen based on the magnified image of blood cells included in the blood specimen.

* * * * *